Oct. 14, 1958     C. Z. ALEXANDER     2,856,504
HEATING UNIT

Filed Jan. 23, 1957

INVENTOR.
CARL Z. ALEXANDER
BY
Richards & Geier
ATTORNEYS

United States Patent Office 2,856,504
Patented Oct. 14, 1958

2,856,504

HEATING UNIT

Carl Z. Alexander, Chatham, N. J.

Application January 23, 1957, Serial No. 635,773

1 Claim. (Cl. 219—38)

This invention relates to a heating device and more particularly refers to a domestic heating unit adapted for the utilization of anti-freeze fluids.

Prior art constructions have not been able to adapt a heating unit conveniently and efficiently for the utilization of anti-freeze fluids in conjunction with portable electrical heating units for domestic purposes. Numerous expedients have been purported but have been operationally disadvantageous and uneconomical for the average household.

It is an object of the present invention therefore to provide a domestic heating unit in which a suitable fluid is employed as the heat transfer medium.

Another object of the present invention is to provide a portable heating unit for domestic purposes which permits the circulation of the heat transfer medium without the use of pumps or the like.

Still another object of the present invention is to provide a heating unit which has a greater degree of utility and adaptability.

Yet a further object of the instant invention is to provide a heating unit which is economical to operate, maintain and transport.

Other objects of the present invention will become apparent during the course of the following specification.

In the attainment of the aforesaid objectives the preferred embodiment showing the heating unit of the present invention is constituted of an outer hood which may have a plurality of uniformly spaced louvres on each side wall encasing a heating convector element and fins. The heating unit may be electrically and thermostatically operated and controlled respectively. A convector element may be individually disposed within the casing and which has a number of fluid passages therein and through which a copper covered heating coil is disposed. The convector element may be inclined at one end to permit the heat transfer medium to return unhinderingly to an opposite end of the convector element when it has completed its passage through a heating pipe disposed longitudinally directly above the convection element. The heating pipe may have a plurality of transverse fins longitudinally disposed for radiating the heat transferred to them. The heating unit may be equipped with a safety relief valve at one end of the heating pipe.

It will become apparent from this construction that the heat transfer medium circulates uni-directionally in repeated cycles throughout the heating unit continuously.

A fuller understanding of the present invention may be had by referring to the following description taken in conjunction with the accompanying drawings, showing, by way of example, a preferred embodiment of the inventive idea.

Figure 1:
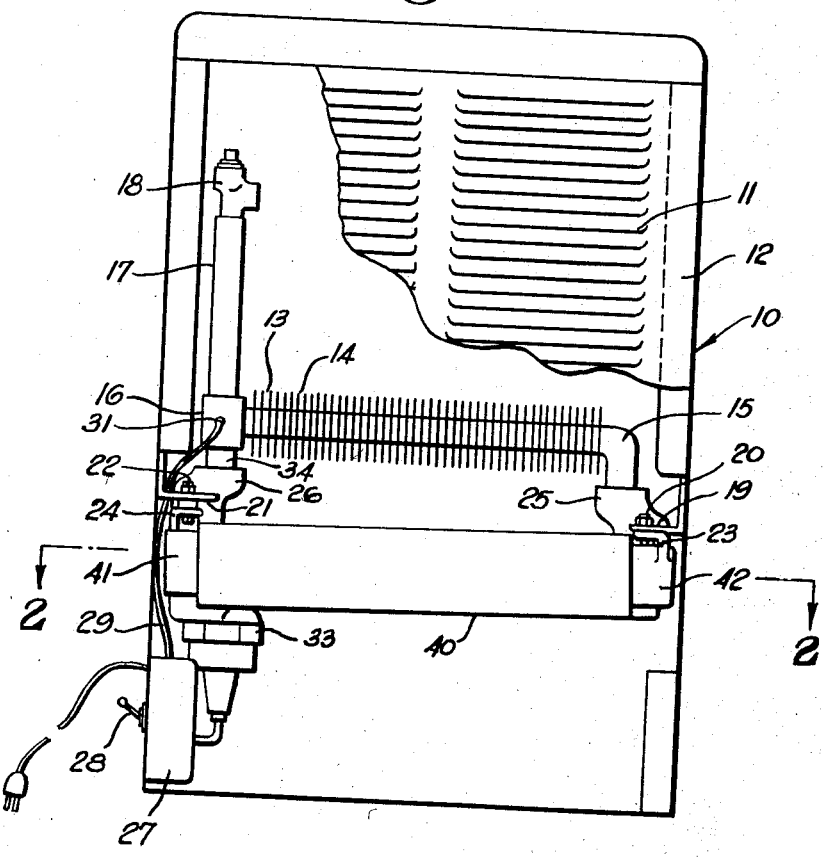
Figure 1 is a front elevational view showing the device partly in section constituting the present invention.

Referring now in greater detail to the drawings, reference numeral 10 indicates the heating unit and like reference numerals indicate like parts. The heating unit 10 has a rectangularly shaped outer hood 12 constituting a plurality of louvres 11 uniformly spaced on each side wall of the outer hood 12.

A convector element 40 is firmly fastened within the outer hood 12 at opposite ends 41 and 42 thereof through integrally formed extension arms 23 and 24 to support members 19 and 21, respectively.

It will become apparent from this construction element 40 is horizontally inclined in relation to the hood 12 through an angle of 5°, the upgrade occurring in the direction of the end member 42. Fastening means 20 and 22 are secured firmly to the convector element 40 with the support members 19 and 21, respectively.

A heating pipe 15 is disposed longitudinally directly above the convector element 40 and is provided with a plurality of transverse fins 14 disposed uniformly along the heating pipe 15.

A T-member 16 connects one end of the fin element 13 and is provided with a vertical extension 17 upon which a safety relief valve 18 is secured. The opposite end of the heating pipe 15 is secured to a connector extension 25 which is integrally formed with the convector element 40 at the end member 42.

The T-member 16 is provided with an orifice 31 adapted to allow an electrical cord 29 to be inserted therein. An opposite end of T-member 16 has an intermediate connector 34 which communicates with a liquid return pipe 26. The liquid return pipe 26 is integrally formed to one end member 41 of the convertor element 40.

A port 33 is integrally formed with the end member 41 and serves in addition to other purposes as an inlet for a copper covered heating element 32.

A switch 28 is secured to the outer hood 12 for controlling the operation of the heating unit 10. A thermostat 27 is attached to the switch 28 to regulate the temperature thereof and has an electrical cord 29 extending to the T-member 16.

Figure 2:
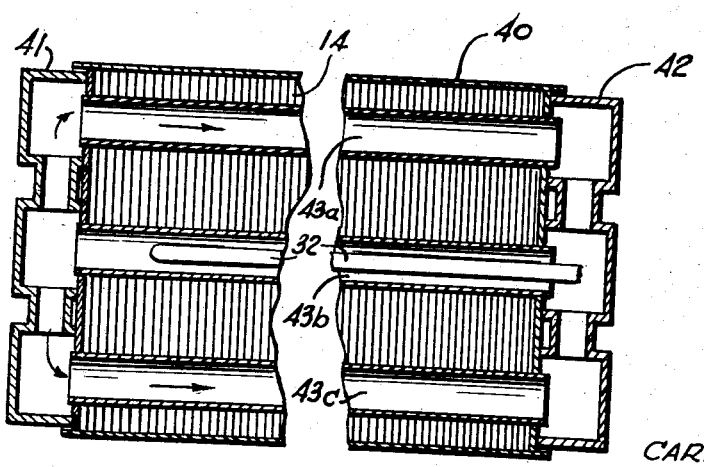
Figure 2 is a cross-sectional view of the convector element taken along the line 2—2 as shown in Figure 1.

The copper covered heating coil 32 extends through the port 33 and is placed longitudinally within the fluid passage 43b as illustrated in Figure 2. The electrical cord 29 which leads to the T-member 16 is provided as a means for thermostatically controlling the operation of the heating unit 10.

The convector element 40 may be obtained commercially as an individual hot water heating unit. The selective capacity of the convector element including the number of tubes and fluid passages it contains, may vary dependent upon the dimensions of the room to be heated.

In this respect the convector element 40 may be provided with a double end electrode disposed longitudinally in passages 43a, b or c and may be connected to a junction box at one end thereof. The temperature of the liquid may operatively control the unit.

When the heating unit 10 is connected to a suitable electrical outlet and the copper covered heating coil 32 heats the fluid within the passage 43 continuously, the heated fluid circulates uni-directionally through the heating pipe 15 from the end member 42 and returns to the convector element 40 through the return pipe 26 to the end member 41. Through the course of its circulatory movement, the heated fluid in the heating pipe 15 transfers its heat to the longitudinally disposed transverse fins 14. The cycle is repeated until a desired temperature is attained within the room at which time the heating unit is thermostatically rendered inoperative.

Within the confines of the convector element 40, the liquid circulates upwardly throughout the convector element 40 in a manner indicated by arrows as shown in Figure 2, flowing through passages 43b, 43a and 43c. Upon return of the condensate the cycle is repeated.

It will be understood that the invention is not limited to the exact disclosure herein described but may lend itself to a variety of expressions within the scope of the appended claim.

What is claimed is:

A heat radiating unit, comprising in combination with a convector element having a heating element and adapted to contain a heating liquid; a hood having an upper louvered portion and a lower portion, opposed support members located within said lower portion of the hood and having extension arms supporting said convector element in an inclined position, whereby said convector element has an upper end and a lower end, a convector extension member connected with the upper end of said convector element, a fin-carrying heating pipe extending above said convector element and having one end connected with said convector extension member, a T-member connected with the other end of said heating pipe, a liquid return pipe connected with said T-member and the lower end of said convector element, means connected with said lower end of the convector element below said liquid return pipe and forming a port and an inlet for said heating element, a vertical extension member carried by said T-member and located within said upper portion of the hood, and a safety relief valve carried by said vertical extension member.

References Cited in the file of this patent

UNITED STATES PATENTS

| | | |
|---|---|---|
| 1,788,515 | Gannon | Jan. 13, 1931 |
| 1,866,221 | Pennington | July 5, 1932 |
| 1,983,437 | Carr | Dec. 4, 1934 |
| 2,276,407 | Manzer | Mar. 17, 1942 |
| 2,736,790 | Alexander | Feb. 28, 1956 |